(12) United States Patent
Ferreira et al.

(10) Patent No.: US 10,145,147 B2
(45) Date of Patent: Dec. 4, 2018

(54) LOW-CONSUMPTION CLUTCH ACTUATING MECHANISM FOR ELECTRONIC CYLINDERS IN LOCKS AND METHOD FOR OPERATING THE SAME

(71) Applicant: SALTO SYSTEMS S.L., Oiartzun (Guipuzcoa) (ES)

(72) Inventors: Carlos Ferreira, Oiartzun (ES); Ander Muñoz, Oiartzun (ES)

(73) Assignee: SALTO SYSTEMS S.L., Oiartzun (Guipuzcoa) (ES)

( * ) Notice: Subject to any disclaimer, the term of this patent is extended or adjusted under 35 U.S.C. 154(b) by 65 days.

(21) Appl. No.: 15/516,984

(22) PCT Filed: Mar. 21, 2016

(86) PCT No.: PCT/ES2016/070192
§ 371 (c)(1),
(2) Date: Apr. 5, 2017

(87) PCT Pub. No.: WO2017/162891
PCT Pub. Date: Sep. 28, 2017

(65) Prior Publication Data
US 2018/0187453 A1 Jul. 5, 2018

(51) Int. Cl.
*E05B 47/06* (2006.01)
*E05B 17/04* (2006.01)
(Continued)

(52) U.S. Cl.
CPC ........ *E05B 47/0642* (2013.01); *E05B 17/045* (2013.01); *E05B 47/0012* (2013.01);
(Continued)

(58) Field of Classification Search
CPC ...... E05B 17/04; E05B 17/044; E05B 17/045; E05B 47/0012; E05B 47/0611;
(Continued)

(56) References Cited

U.S. PATENT DOCUMENTS 4,832,385 A * 5/1989 Llort ................... E05B 47/0688
292/144
5,628,217 A * 5/1997 Herrera ................. E05B 35/001
70/278.3
(Continued)

FOREIGN PATENT DOCUMENTS

DE 100 65 155 A1 6/2002
DE 10 2007 000 439 A1 2/2009
(Continued)

OTHER PUBLICATIONS

Written Opinion of the International Searching Authority of PCT/ES2016/070192 dated Jan. 30, 2017.
(Continued)

*Primary Examiner* — Christopher J Boswell
(74) *Attorney, Agent, or Firm* — Sughrue Mion, PLLC

(57) ABSTRACT

Clutch actuating mechanism for electronic cylinders in locks and method for operating the same.
The clutch actuating mechanism for an electronic cylinder in locks relates, in particular, to a clutch actuating mechanism which is responsible for storing the energy supplied by the motor and returning said energy to the clutch at the moment it passes from a clutched position to a declutched position, all of this being carried out with reduced energy consumption. It also relates to the method for operating said mechanism.

17 Claims, 13 Drawing Sheets

(51) Int. Cl.
*E05B 47/00* (2006.01)
*F16D 67/06* (2006.01)
*E05B 35/00* (2006.01)

(52) U.S. Cl.
CPC ...... *E05B 47/0615* (2013.01); *E05B 47/0649* (2013.01); *F16D 67/06* (2013.01); *E05B 35/007* (2013.01); *E05B 2047/0026* (2013.01); *E05B 2047/0031* (2013.01)

(58) Field of Classification Search
CPC ............ E05B 47/0615; E05B 47/0638; E05B 47/0642; E05B 2047/0014; E05B 2047/0015; E05B 2047/0017; E05B 2047/0018; E05B 2047/0024; E05B 2047/0026; E05B 2047/0027
See application file for complete search history.

(56) References Cited

U.S. PATENT DOCUMENTS

| | | | | |
|---|---|---|---|---|
| 6,158,259 A * | 12/2000 | Schmitz | .................. | E05B 9/045 70/223 |
| 6,334,347 B1 * | 1/2002 | Iscla | ....................... | E05B 9/042 70/277 |
| 6,523,377 B1 * | 2/2003 | Vonlanthen | ......... | E05B 47/0012 70/278.3 |
| 7,874,190 B2 * | 1/2011 | Krisch | ................ | E05B 47/0649 70/277 |
| 8,973,417 B2 * | 3/2015 | Bench | ................ | E05B 47/0673 70/278.1 |
| 9,909,340 B2 * | 3/2018 | Bock | ....................... | E05B 37/00 |
| 2006/0213240 A1 | 9/2006 | Krisch et al. | | |
| 2008/0180211 A1 * | 7/2008 | Lien | .................... | E05B 47/0615 340/5.61 |
| 2013/0305792 A1 * | 11/2013 | Lien | .................... | E05B 47/0012 70/278.7 |

FOREIGN PATENT DOCUMENTS

| | | |
|---|---|---|
| EP | 2 860 331 A1 | 4/2015 |
| GB | 2 259 737 A | 3/1993 |
| WO | 2014/128106 A1 | 8/2014 |

OTHER PUBLICATIONS

International Search Report of PCT/ES2016/070192 dated Jan. 30, 2017.

* cited by examiner

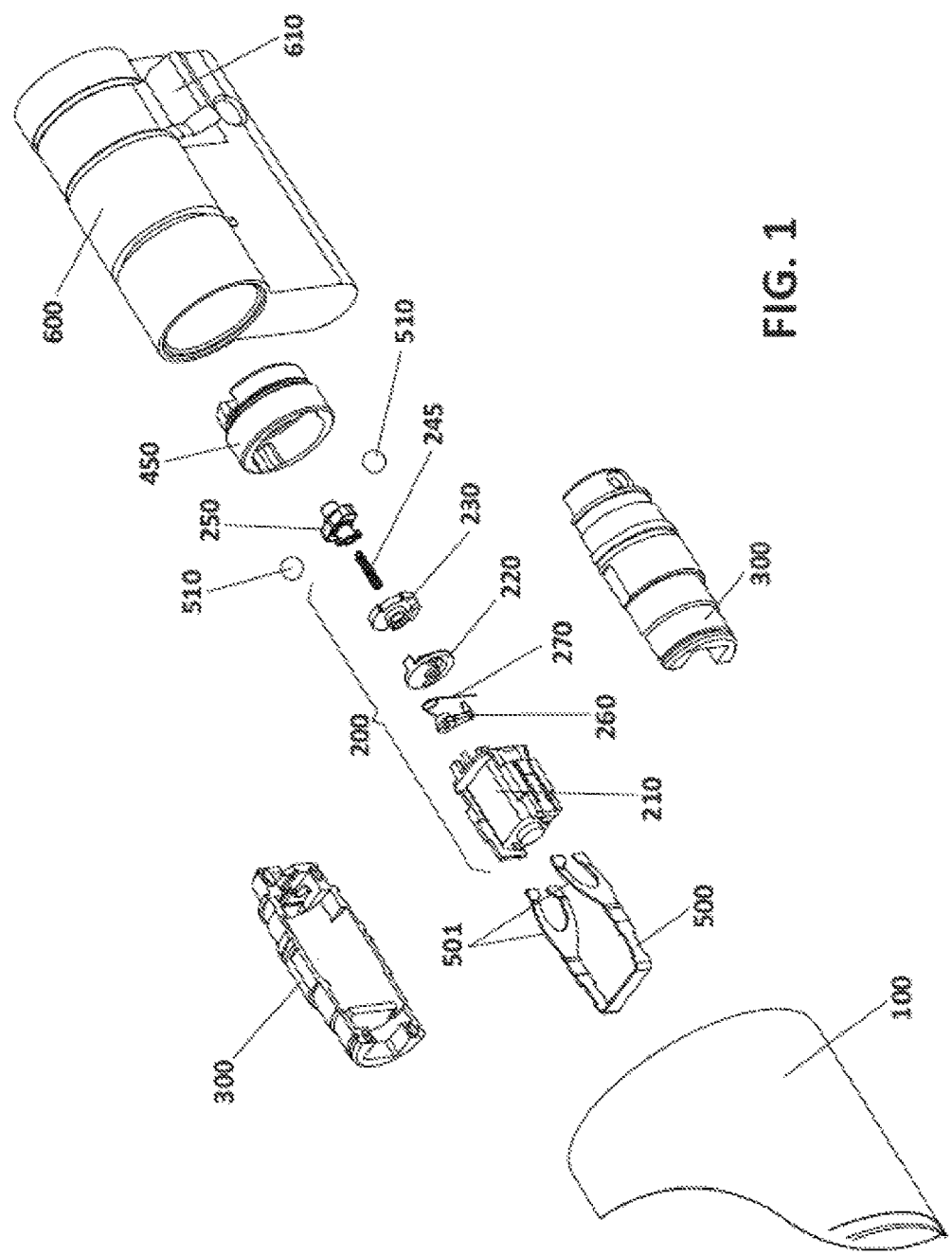

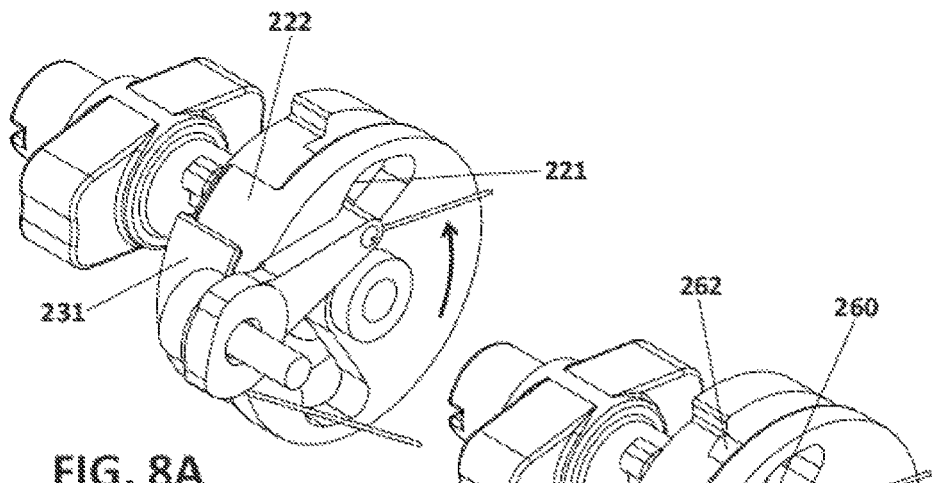
FIG. 8A
FIG. 8B
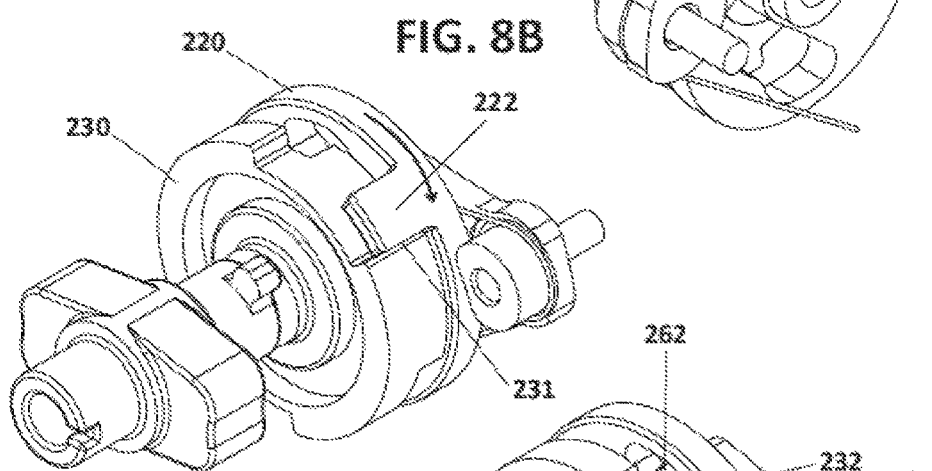
FIG. 9A
FIG. 9B

LOW-CONSUMPTION CLUTCH ACTUATING MECHANISM FOR ELECTRONIC CYLINDERS IN LOCKS AND METHOD FOR OPERATING THE SAME

CROSS REFERENCE TO RELATED APPLICATIONS

This application is a National Stage of International Application No. PCT/ES2016/070192 filed Mar. 21, 2016, the contents of which are incorporated herein by reference in its entirety.

SECTOR OF THE INVENTION

The present invention relates to a low-consumption clutch actuating mechanism for electronic cylinders in locks and a method for operating the same and in particular to a clutch actuating mechanism which is responsible for transmitting a rotational movement between a first rotor and a second rotor associated with an electronic cylinder with a reduced electrical consumption for increasing the useful life of the battery which actuates said cylinder as well as the stages associated with the method. The mechanism relates to a clutch actuating mechanism which is responsible for storing energy supplied by the motor and returning said energy to a clutch at the moment of going from a clutched position to a declutched position, limiting the energy consumption.

The invention is framed within the field of electronic closing systems and within this field in the field of electronic cylinders.

STATE OF THE ART

In the state of the art, electronic or mechatronic cylinders are known for having an electronically controlled closing system which is generally actuated by an electronic key. The mechanism of the cylinder includes an electric motor and a battery which has a fundamental role in actuating a clutch mechanism.

The greater the size of the components in the current clutch systems, the electronic motors, in addition to being a greater size in order to be able to displace said components, require more electric energy which directly affects the useful life of the batteries responsible for feeding the electric motor and therefore affects the maintenance of the system.

The objective of the present invention is therefore to reduce as far as possible the size of the components of the clutch actuating mechanism as well as the friction between them, whilst maintaining the functions thereof in order to reduce the energetic demand on the electric motor and thus reduce the consumption of the batteries which actuate it in order to prolong the useful life of the electronic cylinder for the longest possible time.

In the state of the art, clutch mechanisms actuated directly by the electric motor of the cylinder are known and usually comprise an endless screw inseparable from the drive axle of the motor which is responsible for displacing the clutch elements. The displacement of these clutch elements directly by the motor requires greater functioning time of the motor and therefore greater electrical consumption which directly affects the duration of the batteries. The present invention of the clutch actuating mechanism can achieve, due to the components thereof, to the arrangement of the same and to the fact that the motor directly actuates the clutch elements, up to a 50% energetic saving of the battery for the same number of activation cycles of the clutch mechanism.

In the state of the art, different clutch mechanisms actuated directly by an electric motor are known and allow the transmission of a rotational movement between two components as a function of the position of transmission elements situated between both components. Said transmission elements comprise at least one radial movement such that it makes possible the introduction thereof or otherwise into housings or cavities arranged in one of the components. Said transmission elements are arranged on the same axis and separated by an elastic element which allows the radial displacement thereof. For example, the patent application number DE10065155 shows a clutch mechanism for cylinders which comprises a solution like the one cited. Furthermore, the patent application number DE102007000439 also describes and shows two transmission elements with elastic means which allow the radial displacement thereof. Furthermore, the patent application number GB2259737 describes a clutch mechanism with two spheres which are displaced over an interior surface and which are introduced into housings as a function of the situation of an element situated between both spheres and which is actuated by an electric motor.

Furthermore, the mechanism, due to the components thereof and to the arrangement of the same, guarantees appropriate protection against current techniques for breaching electronic cylinders, implemented by means of manual tests, thus increasing security. This, associated with the reduced size thereof, allows additional protection means against said breaches to be incorporated.

DESCRIPTION OF THE INVENTION

For the above purpose, the present invention provides, according to a first objective of the invention, a clutch actuating mechanism for an electronic cylinder for locks, which comprises an electronic motor and different components for controlling the transmission of a rotational movement by way of clutch elements situated between a first rotor and a second rotor associated with a cylinder body such that when the first rotor, associated with the clutch actuating mechanism rotates and when it is clutched, the transmission of the rotational movement from the first rotor to the second rotor is produced, due to the interaction of the clutch actuating mechanism with said clutch elements, thus actuating the eccentric. In the case that the clutch actuating mechanism is declutched, the rotation of the first rotor does not transmit the movement to the second rotor and therefore the eccentric is not actuated.

In the cited mechanism, the first rotor, which houses the clutch actuating mechanism, is connected to the knob of the electronic cylinder, usually associated with a door, although it can be incorporated into other devices such as vehicles or padlocks and in general any device, the access of which must be controlled and incorporates, in the interior thereof, the electronic system and the power supply which feeds both the electronic system and the electric motor. Said first rotor is installed in the cylinder of the lock and connected by way of clutch elements, which interact with the clutch actuating mechanism, to the second rotor, which, upon rotating, actuates the lock by way of the cylinder.

In view of the foregoing, an electronic cylinder can be considered as formed by two mechanisms:
 a transmission or clutch mechanism which comprises the clutch elements and is responsible for transmitting a rotational movement from a first rotor actuated by a knob to a second rotor connected to a cam or eccentric which actuates the lock, and a clutch actuating mechanism responsible for controlling when said clutch mechanism transmits or does not transmit the movement between the first rotor and the second rotor.

Therefore, a first objective of the invention is a clutch actuating mechanism according to claim one.

Specifically, the clutch actuating mechanism of an electronic cylinder for locks which controls the transmission of a rotational movement by way of clutch elements between a first rotor, in the interior of which the clutch mechanism is situated, and a second rotor which, with the rotation thereof, transmits a movement to an eccentric, comprises:

an electric motor which actuates a drive axle which is coaxial to a first axis (a) and which rotates in two directions;

a first body installed in an inseparable manner on said drive axle and which comprises a cam and first pushing means;

a second body coaxial to said first axis (a), arranged after said first body and which comprises first drive means and brake means;

a third body coaxial to the first axis (a), arranged after said second body and via which the clutch elements are actuated, wherein said third body rotates between a declutched position, in which the movement is not transmitted between the first and second rotors and a clutched position, in which the movement is transmitted between the first and second rotors;

a moving brake element which has a protrusion at one end, said protrusion being associated with said cam of the first body;

a first elastic element in contact with said brake element for controlling the position of the same in relation to the cam of the first body and in relation to the brake means of the second body; and a second elastic torsion element between the second body and the third body and connected to both, by means of which a rotation in a first direction of the drive axle produces a rotation of the first body between an initial position and a final position and produces a transmission of a rotational movement from said first body to the second body and from the second body to the third body with a smaller rotational angle than that of the second body, causing an elastic load of the second elastic element.

A second objective of the invention relates to a method for operating said clutch actuating mechanism according to claim 14. In the method for operating the previous actuating mechanism, when the first body rotates between an initial position and a final position, or vice versa, the protrusion of the brake element travels a path followed by the cam determining the following positions:

a locking position of the brake element when the protrusion is slid through the first section of a first end of the groove, preventing the rotation of the second body a transition position of the brake element from locking to unlocking when the protrusion goes from being slid from the first section of the groove to the second section of the same, or vice versa, that is to say, going from unlocking to locking going from the second section to the first section, a transmission position where the brake element is not locking said second body and the protrusion is slid through the second section of the groove, a transition position of the brake element from unlocking to locking when the protrusion goes from being slid from the second section of the groove to the first section of a second end of the same, or vice versa, that is to say, going from locking to unlocking going from the first section to the second section and a locking position of the brake element when the protrusion is slid through the first section of the second end of the groove.

By means of the previous components and the cited method, the rotation in a first direction of the drive axle of the electric motor on the rotational axis produces the rotation of the first body between two positions A and B, an initial position and a final position and specifically produces the transmission of a rotational movement from said first body, by way of the different components, to the third body such that said third body, once the rotation of the drive axle of the motor in said first direction has ceased, can:

be maintained in a declutched position, due to the clutch elements arranged between the first rotor and the second rotor which act on the third body preventing the rotation of the same and causing the overloading of the second elastic element due to the rotation of the second body and the impossibility of the rotation of the third body, or can rotate from the previous declutched position to a clutched position, when the clutch elements arranged between the first rotor and the second rotor cease to act on the third body, causing the easing or unloading of the second elastic element which forces the rotation of said third body to the cited clutched position, or can rotate directly from the declutched position to the clutched position, enabling the rotation of the second rotor by way of the clutch elements arranged between the first rotor and said second rotor when these elements do not prevent the rotation of the third body.

The clutch actuating mechanism enters into operation when, after initiating the electric motor, usually by means of an electronic card which actuates the electronic system installed in the knob, the motor rotates the drive axle, preferably less than one turn and causes the rotation of the third body which, as a function of the position of the clutch elements of the clutch mechanism situated between the first and the second rotor, causes the rotation of the second rotor when the knob rotates and therefore actuates or does not actuate the lock.

The cited cam arranged in the first body is a groove which passes through said body and which follows a particular path through the interior of which the protrusion of the brake element slides. Said protrusion is pushed by the first elastic element against one of the two surfaces of the groove, an upper surface and a lower surface, the support surface of the protrusion being the first surface. The protrusion is therefore arranged between the first surface and the first elastic element. Said first surface can be the upper surface if the first elastic element pushes the protrusion at the lower part of the protrusion itself, or the lower surface if the first elastic element pushes the protrusion at the upper part of the same. Moreover, the first surface must follow the path through which the protrusion slides when the first body rotates such that, as a function of said path, the protrusion rises or lowers when the brake element pivots with respect to the second axis, parallel to the rotational axis of the drive axle of the motor. The first elastic element is a torsion spring which also pivots with respect to the second axis, said first elastic element comprising a first arm responsible for pushing the protrusion against the first surface and a second arm, angled with respect to the first and which, supported against the other surface, maintains the elastic element elastically loaded.

The first surface of the cited groove or cam follows a path which has at least three sections, two first sections situated at the ends of the cam or groove and one second intermediate section situated between the two first sections. Said path can have different forms while it allows the protrusion in the first sections to be situated at a different height with respect to the axis of the drive axle than in the intermediate section.

The different positions are described in greater detail below, according to the method of the invention, which the second body can have with respect to the first body depending on the situation in which the protrusion is located in the cam when the drive axle and therefore the first body is rotating around the rotational axis thereof:

Locking position: when the drive axle is at rest or at the start of the rotation of the same and while the protrusion is pushed against any of the two first sections of the cam, said protrusion which passes through the cam is in contact with the brake means of the second body. Said brake means are preferably a projection or a notch on the surface of the second body such that when the protrusion is located at a determined height, it interacts with the brake means, thus limiting the movement of the second body with respect to the first body and defining said locking position of the brake element and of the second body.

Transition position: once the drive axle rotates, the protrusion is faced with the change of path between the first section and the second intermediate section of the cam or groove, therefore changing height and forcing or compressing said protrusion to the first elastic element, thus eliminating the contact between said protrusion and the brake means of the second body and defining a transition position present between the first section and the intermediate section or vice versa.

Transmission position: when the rotation of the drive axle continues, the protrusion continues following the path of the first surface of the cam through the second intermediate section after leaving the first section of the same after its journey. In this second intermediate section, the protrusion is still not in contact with the brake means of the second body, however, the pushing means of the first body contact, in the rotation thereof, the drive means of the second body such that the rotation of the first body which is inseparable from the drive axle causes the rotation of the second body. In this way, a transmission position of the rotational movement of the first body to the second body is defined, where the brake element is now not locking the second body. Said pushing means and drive means can be protrusions or indentations arranged in one body or another, but always complementary means which allow for means to push and drive the other means.

Therefore, during the rotation of the drive axle and of the first body inseparable from said drive axle, in any of the two rotation directions of the drive axle, the previously mentioned succession of positions of the method between the first and the second body is produced as the protrusion covers the first surface of the cam:

locking position of the brake element,
transition position of the brake element,
transmission position where the brake element is not locking,
transition position of the brake element and
locking position of the brake element.

According to the previous succession of positions, the second body is in a locking position with respect to the first body when the protrusion is at any of the ends of the cam or close thereto, after passing the transition area between the first section and the second section at a first end of the cam or after passing the second section to the first section at the second end of the cam.

Once it is defined how the movement is transferred from the first body to the second body when the first body rotates, it should be described how said rotational movement is transferred from the second body to the third body, this third body having a smaller rotational angle than the second body and causing an elastic load of the second elastic element. To this end, there is at least two preferred options:

in a first alternative, the second body and the third body are joined by the second elastic element which is arranged axially to the rotational axis of the drive axle such that said second elastic element transmits the rotation of the second body to the third body, causing a rotation in the third body from the first declutched position to the second clutched position when the clutch elements arranged between the first and second rotor allow it. The second elastic element is preferably a torsion spring, which, in turn, maintains the second and third bodies joined by traction. Said torsion spring acts in cooperation with pushing means arranged in the second body and drive means situated in the third body.

In a second alternative, the second body comprises second pushing means and the third body comprises second drive means, preferably indentations and protrusions arranged radially one over the other on the surfaces of both bodies and the second elastic element being arranged between both bodies. In this alternative, the second elastic element is a torsion spring which pivots with respect to the rotational axis of the drive axle of the motor and which comprises a first end or arm, supported on a side of the second pushing means of the second body and a second arm slightly angled with respect to the first arm or end and supported on a side of the second drive means of the third body such that when the pushing and drive means are separated, due to the rotation of the second body with respect to the third body or vice versa as a function of the clutch elements, the second elastic element is elastically loaded. Said third body rotates with respect to said second body and therefore between the clutched and declutched position or vice versa, that is to say, the second body with respect to the third body, depending on whether the clutch elements between the first and second rotor allow it.

In any of the two previous alternatives, if the clutch elements between the first and second rotor are acting on the third body, preventing the rotation thereof even when the second body rotates, the rotation of said second body with respect to the third body at a greater rotational angle causes the second elastic element situated between both bodies to be elastically loaded such that when the clutch elements cease acting on the third body, it rotates from the first declutched position to the second clutched position. If the clutch elements between rotors do not prevent the rotation of the third body, it goes directly from a declutched position to a clutched position.

The third body rotates between two positions which are limited by stops arranged on the casing or first rotor of the cylinder as well as on the third body itself which preferably allows a maximum rotation of approximately 90°, the maximum rotation of said third body being less than the maximum rotation of the second body which causes the second elastic element to be elastically loaded when the rotation of the second body is greater than that of the third body. That is to say, the rotational angle of the second body is greater than the rotational angle of the third body.

The third body also comprises protrusions intended to interact with the clutch elements of the clutch mechanism.

The clutch elements are arranged between the clutch actuating mechanism and the eccentric of the cylinder which interacts with the lock and which are activated and deactivated by the movement of the motor. The rotation of the knob causes the rotation of the first rotor which comprises, in the interior thereof, the clutch actuating mechanism and which, by way of the cited clutch elements, situated between said first and second rotor, transmits the rotational movement to said second rotor which transmits the movement to the eccentric which interacts with the lock.

As has been mentioned, said clutch elements comprise means for transmitting the rotational movement from a first rotor to a second rotor. Said clutch elements are preferably rolling driving elements which have the capacity to be moved radially pushed by a radial pushing element and said rolling driving elements being situated between said radial push element and the second rotor. The rotation of the first rotor also causes the rotation of the pushing element which acts against the rolling driving elements pushed in turn against the second rotor such that said rolling driving elements follow the surface of the second rotor where they are housed. Depending on the position of said clutch elements and on the connection thereof to the third body of the clutch actuating mechanism, the movement is or is not transmitted from the first rotor to the second rotor and therefore to the eccentric which interacts with the lock.

Therefore, the assembly is clutched when the movement of the rolling driving elements is not possible, the torque being transmitted from the first rotor to the second rotor with the cooperation of the clutch actuating mechanism and it is declutched when the movement of the rolling driving elements is possible, the transmission of the torque between both rotors being prevented.

Different clutch mechanisms can be designed which enable the transmission of the torque from one rotor to another, interacting with the clutch actuating mechanism, taking into consideration that the third body must act on the rolling driving elements of the clutch mechanism like the pushing element.

In the present document, a preferred clutch mechanism is described which comprises, amongst the elements thereof, a preloaded flat or stamped spring as the pushing element, two spheres as the rolling driving elements, the spheres being pushed radially by the ends of arms of the flat spring so that they follow the marked path through the interior surface of the second rotor and the third body of the clutch actuating mechanism being situated between both ends of the arms of the flat spring with the possibility of being moved between the two positions thereof.

Generally, there are three positions between the different clutch elements:
  Declutched position in which the torque is not transmitted between both rotors,
  Clutched position in which the torque is transmitted between both rotors, and
  Transition position in which the torque is also not transmitted between both rotors, although if the first rotor is rotated, said transmission is achieved.

BRIEF DESCRIPTION OF THE DRAWINGS

The foregoing and other advantages and characteristics of the invention will be understood more thoroughly from the following detailed description of exemplary embodiments with reference to the attached drawings which must be viewed in an illustrative and non-limiting manner, in which:

FIG. 1 shows a perspective exploded view of a clutch mechanism and a clutch actuating mechanism as well as the knob and the cylinder.

FIG. 8 shows, from the side of the first body, a perspective view of two positions A, B of the components of the mechanism according to the positions of the brake element with respect to the first and second body corresponding to FIGS. 6E and 6G.

FIG. 9 shows, from the side of the third body, a perspective view of two positions A, B of the components of the mechanism according to the positions of the brake element with respect to the first and second body corresponding to FIGS. 6E and 6G.

DETAILED DESCRIPTION OF THE INVENTION AND EXEMPLARY EMBODIMENTS

Figure 2A:
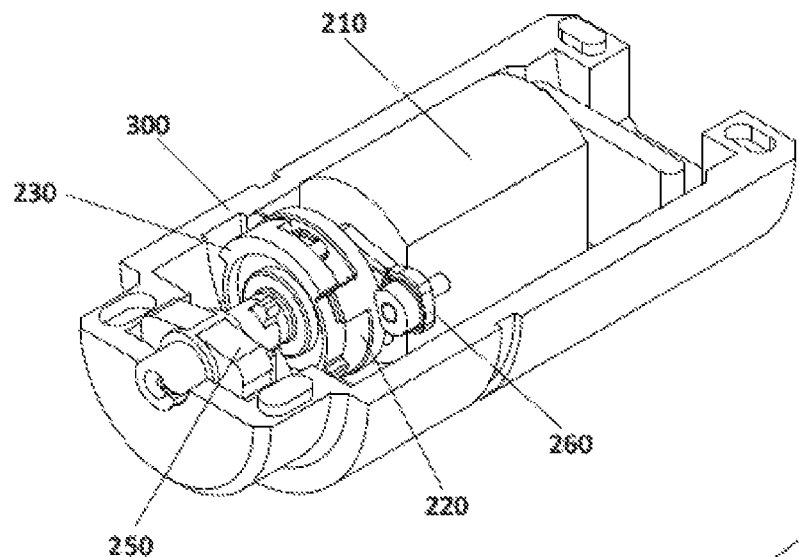
FIG. 2A shows a perspective view of half the casing of the first rotor with the clutch actuating mechanism in the interior thereof.

The invention will be described below according to the attached figures and with reference thereto.

FIG. 1 shows the general assembly of which the clutch actuating mechanism 200, object of the present invention, is a part. The clutch actuating mechanism 200 is situated in a casing or first rotor 300, inseparable at one end from a knob 100 and at the opposing end associated with a second rotor such that a torque exerted on the knob 100 is transmitted from the first rotor 300 to the second rotor 450 due to the coordinated actuation of the clutch actuating mechanism 200 with a clutch mechanism. The rotation of the second rotor 450 transmits a movement to an eccentric 610 inseparable from said rotor which interacts with the lock. All the previous components, with the exception of the knob, are included in the body of an electronic cylinder 600.

The clutch actuating mechanism 200, shown in FIG. 2A, situated in a first rotor or casing 300, is responsible for making a third body 250 rotate from an electric motor 210. The mechanism is formed by an electric motor 210 responsible for converting the electric energy into a rotational movement, a first body 220, a second body 230, a brake element 260, a first elastic element 270, preferably a torsion spring which acts on the brake element 260, the third body 250 and a second elastic element 240, 245 which is also preferably another torsion spring acting as an accumulator spring and which is situated between the second 230 and the third body 250. When the electric motor 210 is initiated in order to cause the rotation of the third body 250 from the first body 220, it transmits the movement thereof to the second body 230 and from the latter to the third body by way of the second elastic element 240, 245. As a function of the position of the clutch elements, the third body 250 can or cannot fully rotate in order to be able to go to the clutched position thereof.

Figure 2B:
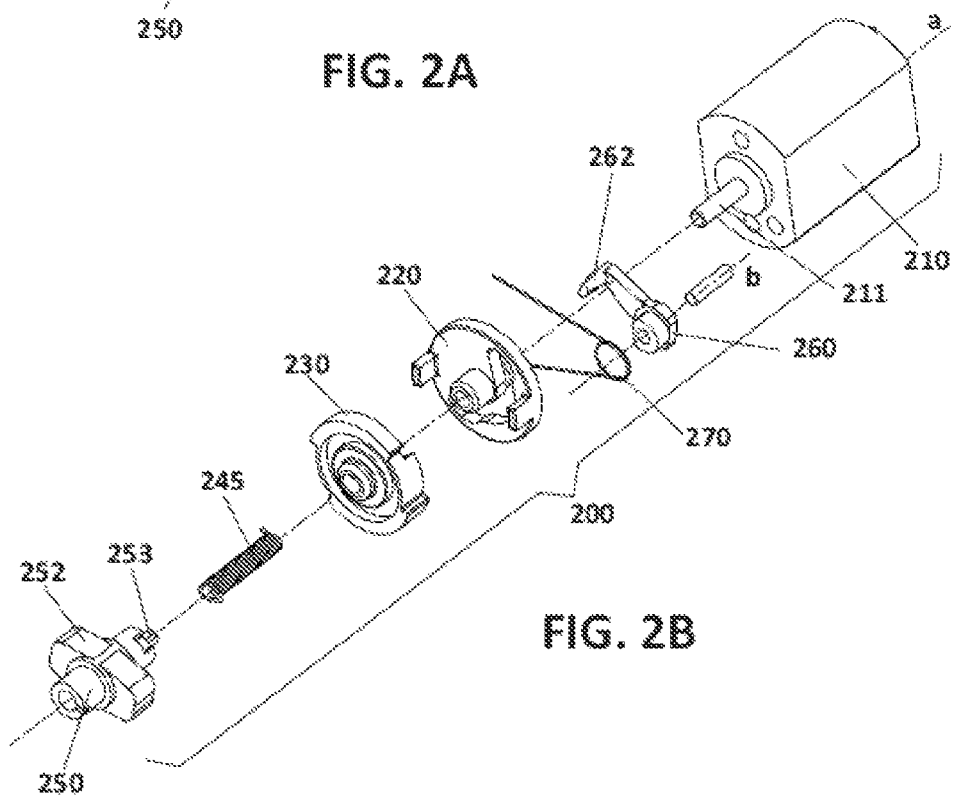
FIG. 2B shows an exploded perspective view of the components of the clutch actuating mechanism object of the invention and shown in FIG. 2A.

In a preferred embodiment, in view of FIG. 2B, the first body 220 and the second body 230 are discs which have protrusions and/or indentations in the surfaces thereof to interact with each other or with other elements of the mechanism as is described below, although the geometry of said bodies is not limited to being circular, even though it is evident that this is optimal for practical reasons, mainly to save space. For example, said first body 220 has, on the surface thereof opposed to the second body 230, a protrusion or protuberance 222, although it may be an indentation in the manner of pushing means 222, while the surface of the second body 230 opposed to the previous surface of the first body 220 has an indentation 231, although it may be a protrusion or protuberance in the manner of drive means 231. The task of said pushing 222 and driving 231 means is to allow the first body 220, when it rotates, to cause the rotation of the second body 230, pushing the latter which is driven.

Said first body 220 is inseparable from the drive axle 211 of the electric motor, fed by the batteries (not shown) such that when the electric motor is operating the drive axle 211 rotates in one or another direction causing the first body 222 to also rotate with respect to the rotational axis "a" coaxially to the drive axle 211. The first body 220 has a cam 211 formed by a groove which passes through the surface thereof.

A movable brake element 260 and a first elastic element or brake spring 270 are arranged between the motor 210 and the first body 220 around a second axis "b" parallel to the first axis or rotational axis "a" of the drive axle 211. The movable brake element 260 is preferably formed by an arm which has, on one of the ends thereof, a protrusion 262, preferably perpendicular to said arm, and on the opposite end, it has means which allow it to be supported and rotate with respect to said second axis "b". The first elastic element 270 is preferably a torsion spring which pivots with respect to the second axis "b" such that it comprises an arm or end 271 responsible for pushing the protrusion 262 upwards or downwards depending on the configuration and a second arm or end 272 angled with respect to the first which is supported against another fixed surface of the system for maintaining the elastic element 270 elastically loaded.

Said protrusion 262 of the brake element 260 is associated with the cam 221 of the first body 220, preferably passing through the same and is slid across one of the two surfaces of said cam, across the upper surface or across the lower surface, the protrusion 262 being pushed against the sliding surface by the cited spring 270. In the figures, it is observed how the protrusion 262 is situated between the first spring 270 and the upper surface of the cam 221, on which it is slid. The surface of the cam 221 on which the protrusion 262 slides has a particular path with the aim of displacing said protrusion 262. Depending on the situation of the protrusion 262 in the cam 221, said protrusion enters or does not enter into contact with brake means 232 arranged on the surface of the second body 230 opposed to the first body 220. Said brake means 232 are depicted by a protrusion or protuberance 232 on said surface, although it may also be an indentation in the same.

Figure 17:
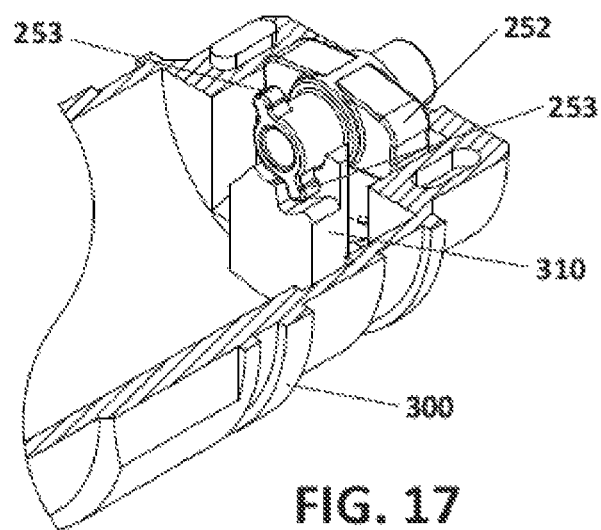
FIG. 17 shows the third body on a part of the casing of a clutch actuating mechanism and the stops which limit the journey during the rotation of the same.

After the second body 230, a third body 250 is arranged situated axially around the rotational axis "a" of the drive axle 211 like the second body 230. A second elastic element 240, 245 is arranged between both second 230 and third 250 bodies. The third body 250 preferably has a cylindrical configuration with two opposing protuberances 252 at both sides of the cylinder. Said third body 250 can rotate between two maximum positions such that in a first position the mechanism is declutched, that is to say, that the movement is not transmitted between the first rotor 300 and the second rotor 450 and in a second position the mechanism is clutched, that is to say, that the movement is transmitted between the first rotor 300 and the second rotor 450. Said positions, first and second, are delimited by the travel stops 310 (FIG. 17) situated on the first rotor 300 when the protrusions 253 of the third body 250 are faced with said stops 310. The clutch elements of the clutch mechanism can prevent, depending on the position of the same, the third body from rotating between said first and second clutched and declutched position, maintaining the same in the declutched or clutched position.

The second elastic element 240, 245 allows, irrespective of the rotation carried out by the second body 230 pushed by the first body 220, the third body 250 to always tend to be aligned with said second body 230 and vice versa, said second elastic element 240, 245 being elastically loaded when the clutch elements prevent the third body 250 from rotating, accompanying the second body 230 or vice versa and being unloaded when said clutch elements cease to act on the third body 250.

Figure 11:
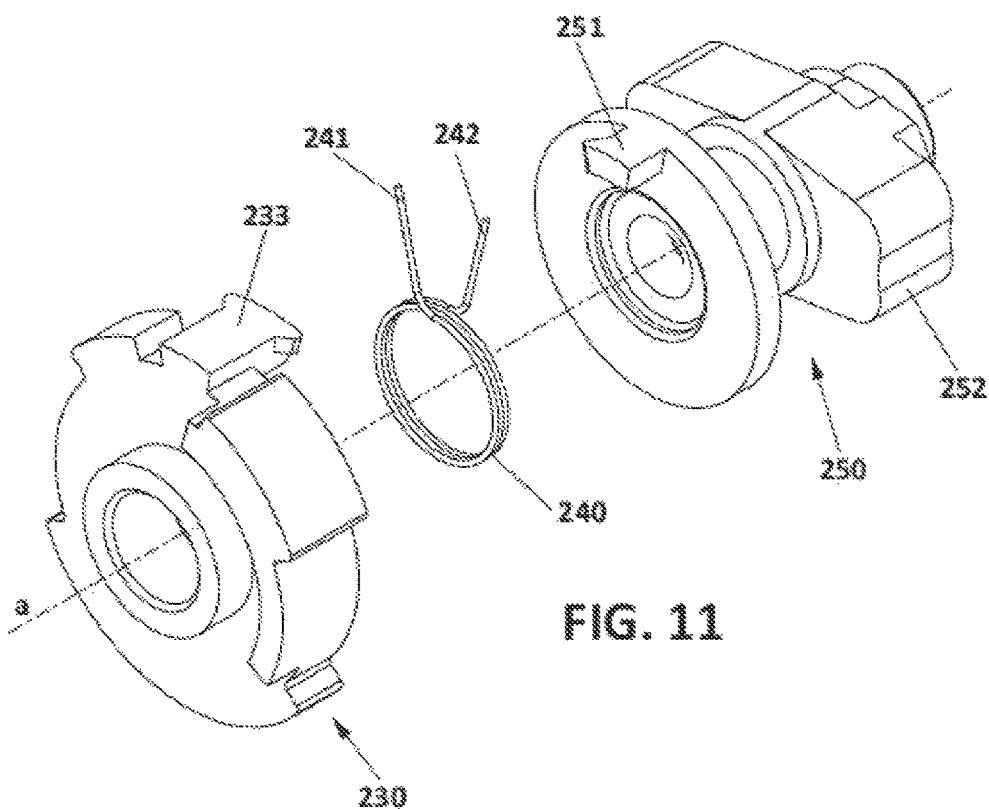
FIG. 11 shows an exploded view of the previous figure.
Figure 12:
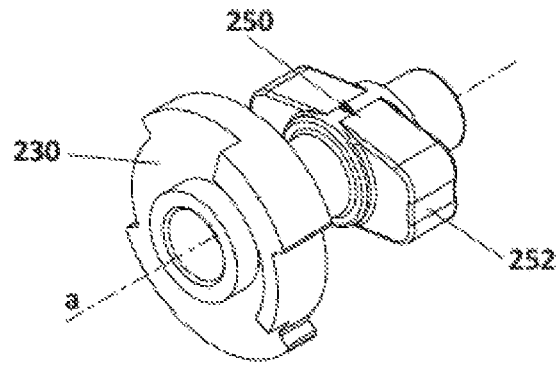
FIG. 12 shows a perspective view of a second exemplary embodiment of the connection between a second and a third body.
Figure 13:
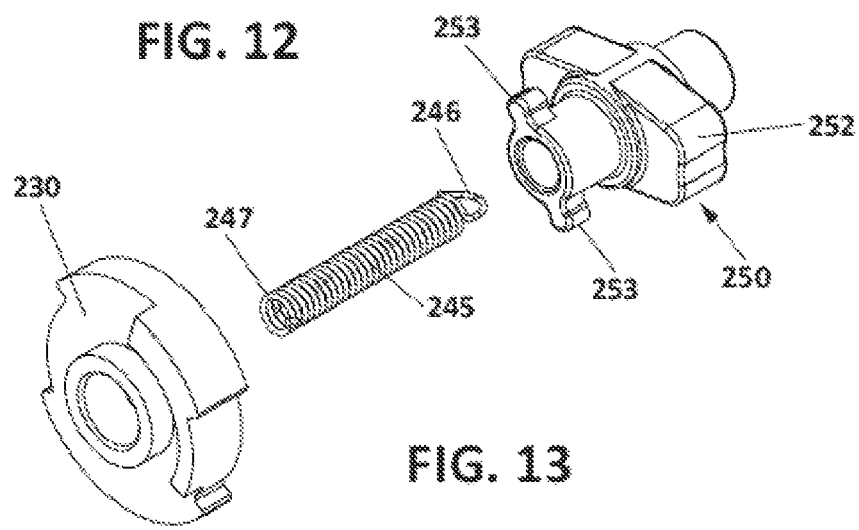
FIG. 13 shows an exploded view of the previous figure.
Figure 14:
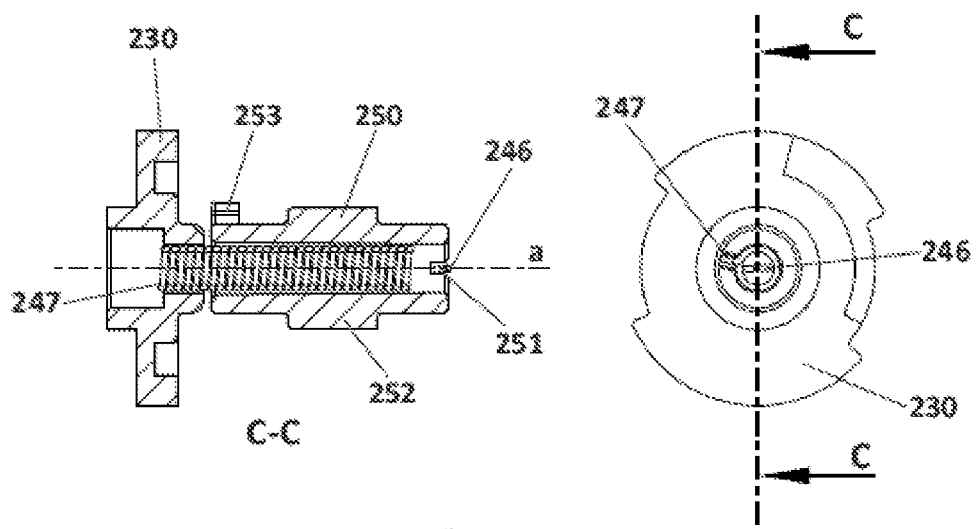
FIG. 14 shows a section of the elements of FIG. 12.
Figure 15:
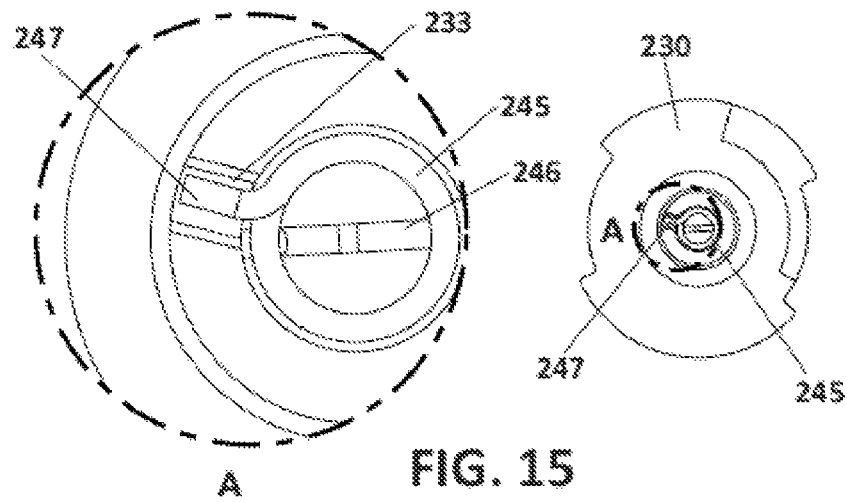
FIG. 15 shows a detail of the coupling between the second elastic element and the second body.
Figure 16:
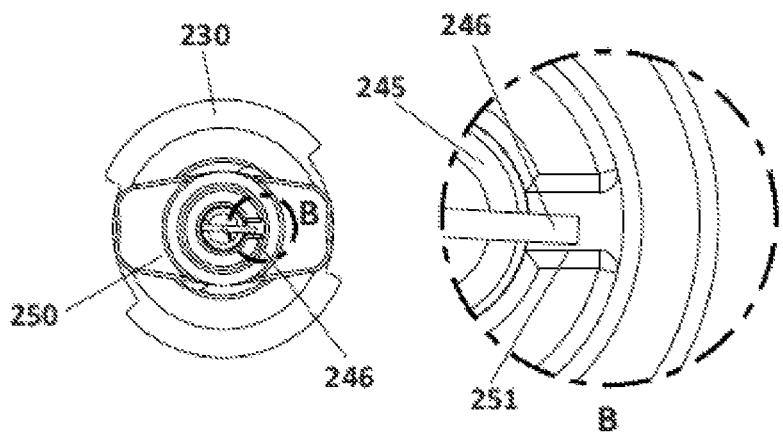
FIG. 16 shows a detail of the coupling between the second elastic element and the third body.

In one alternative, shown in FIG. 11, the second elastic element 240 is a torsion spring 240 situated between second 230 and third 250 bodies, which can pivot with respect to the rotational axis "a" of the drive axle 211 of the motor 210 and which comprises a first end or arm 241, supported via a support protrusion or protuberance 233 of the second body 230 and a second end or arm 242, slightly angled with respect to the first arm or end 241 and supported via a support protrusion or protuberance 251 of the third body 250 such that when the support protrusions 233, 251 of both bodies 230, 250 are separated, the second spring 240 is elastically loaded. Said protuberances are equivalent to second pushing means 233 in the second body 230 and in the third body 250 to second drive means 251 situated radially with respect to each other, but at a different height. Said third body 250 rotates with respect to said second body 230 and therefore between the clutched and declutched position, depending on whether the clutch elements between the first 300 and second 450 rotor allow it.

In another alternative, shown in FIGS. 12 to 16, the second elastic element 245 is a torsion spring which, in addition to allowing the torsion of the same and the rotation of the third body 250 with respect to the second body 230, exerts a traction force between both bodies to maintain both bodies joined. Said second spring 245 joins both bodies when they are situated axially to the rotational axis "a" of the drive axle 211, passing through the rotational axis thereof to the third body 250 and to the second body 230, the ends 246, 247 of said spring 245 being joined to said bodies 250, 230, respectively. In this way, said second elastic element 245 transmits the rotation of the second body 230 to the third body 250, causing a rotation in the third body 250 from the first declutched position to the second clutched position when the clutch elements between the first 300 and second 450 rotor allow it.

Figure 3:
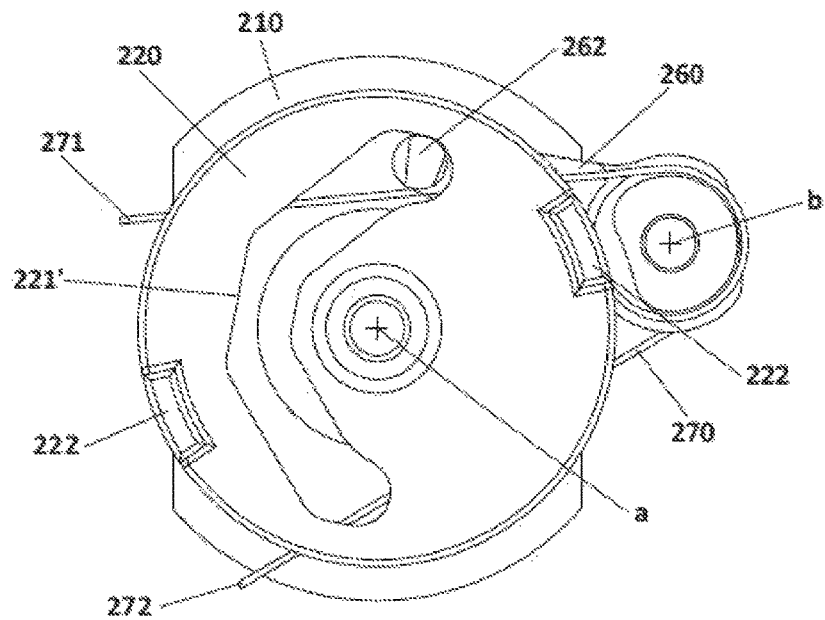
FIG. 3 illustrates a first exemplary embodiment of the cam in the first body of the invention.
Figures 4, 5:
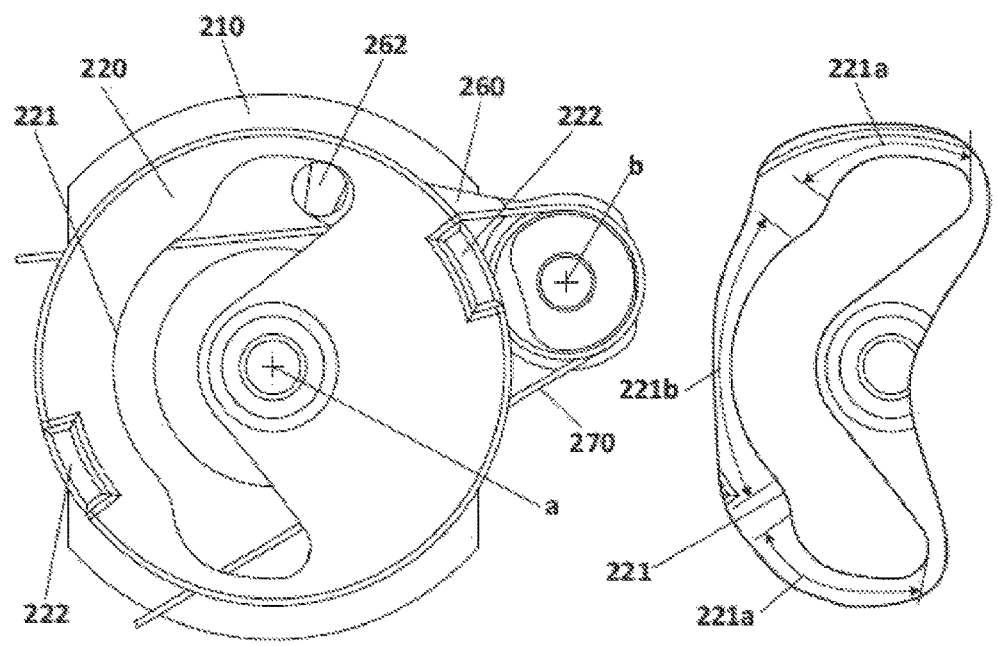
FIG. 4 illustrates a second exemplary embodiment of the cam in the first body of the invention.
FIG. 5 illustrates a detail of the cam of FIG. 4.

In FIGS. 3 and 4, two alternatives of the paths 221', 221 are observed which have a cam 221 on the surface where the protrusion 262 of the brake element 260 is supported or slid when the first body 220 rotates.

As FIG. 5 shows, each one of said alternative surfaces which the cam 221 can follow has a path with at least three sections, two first sections 221a situated at the ends of the cam 221 and a second intermediate section 221b situated between the two first sections 221a. Said path can have different shapes while it allows, in the first sections 221a, the protrusion 262 to be situated at a different height or level with respect to the axis "a" of the drive axle 211 than in the intermediate section 221b.

In the sequences from A to G of FIG. 6, from the front part of the first body 220, opposed to the motor 210 and which rotates between two end positions, the situation of the different elements of the clutch actuating mechanism 200 is observed, principally the first body 220 and the components thereof, the second body 230 and the components thereof, the brake element 260 and the protrusion 262 as well as the first elastic element 270.

Figure 6A:
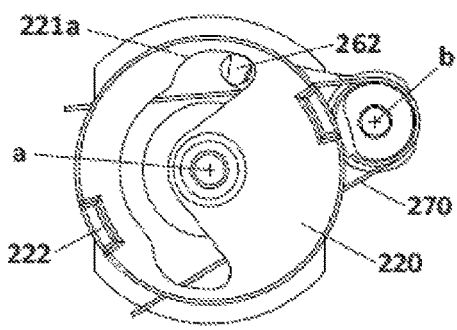
FIG. 6 shows the sequence of positions, A to G, in which the protrusion of the brake element is situated in the cam of the first body.
Figure 6B:
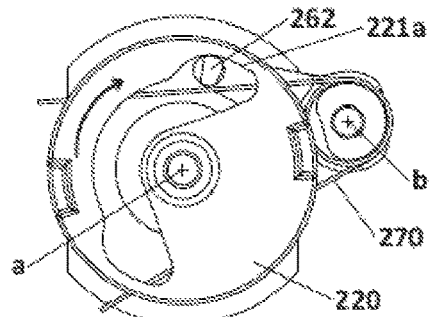
Figure 6C:
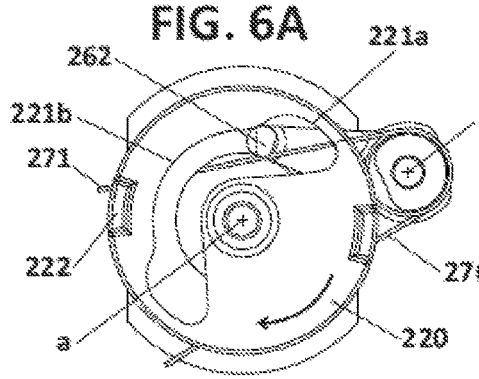
Figure 6D:
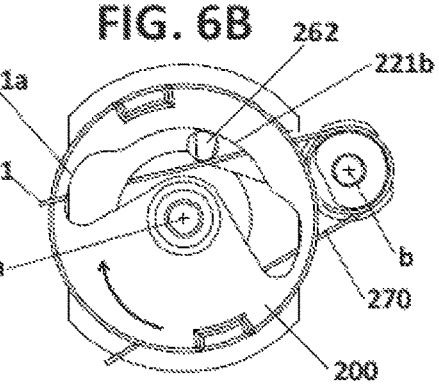
Figure 6E:
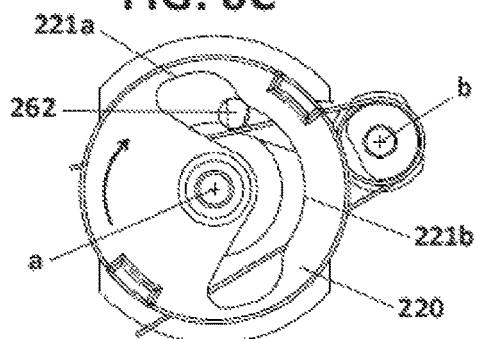
Figure 6F:
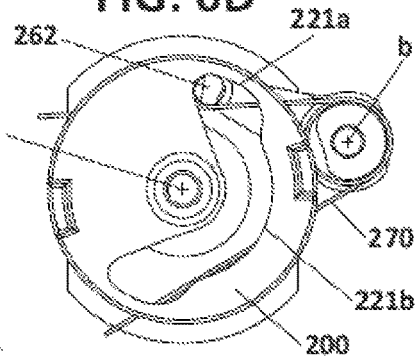
Figure 6G:
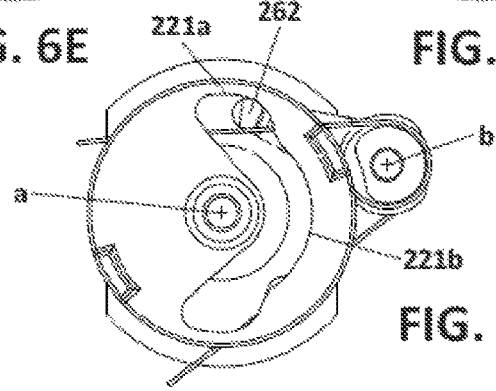
Figure 7A:
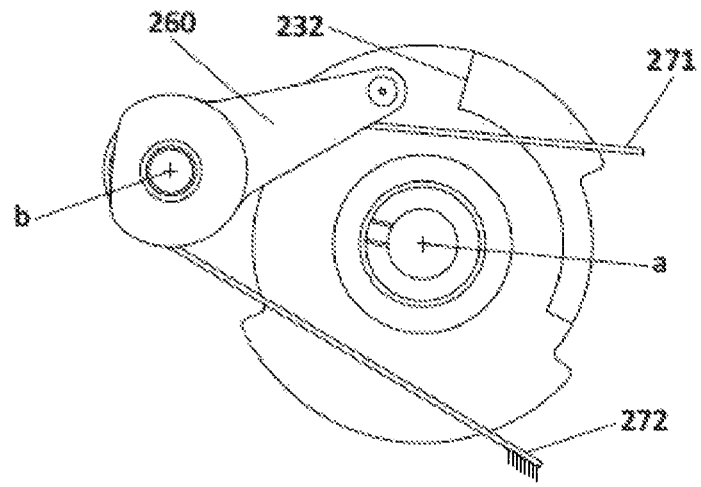
FIG. 7 shows three possible positions, A to C, of the brake element with respect to the second body corresponding to the FIGS. 6A, 6C and 6D.
Figure 7B:
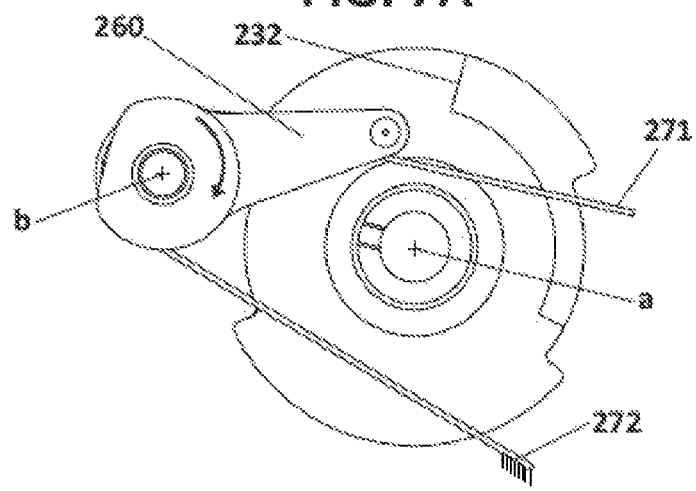
Figure 7C:
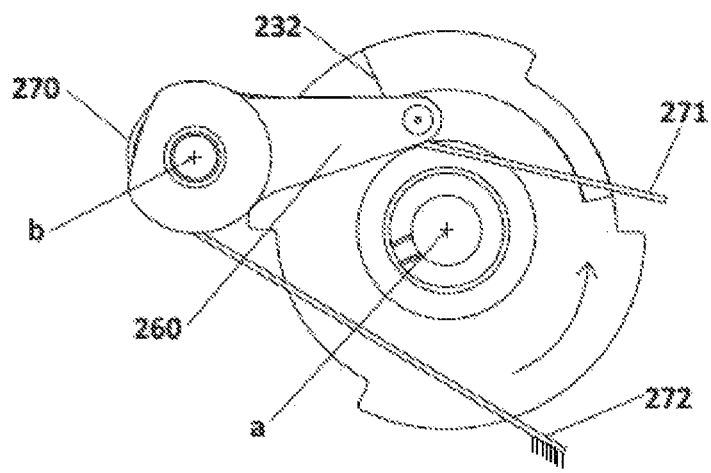
Figure 10:
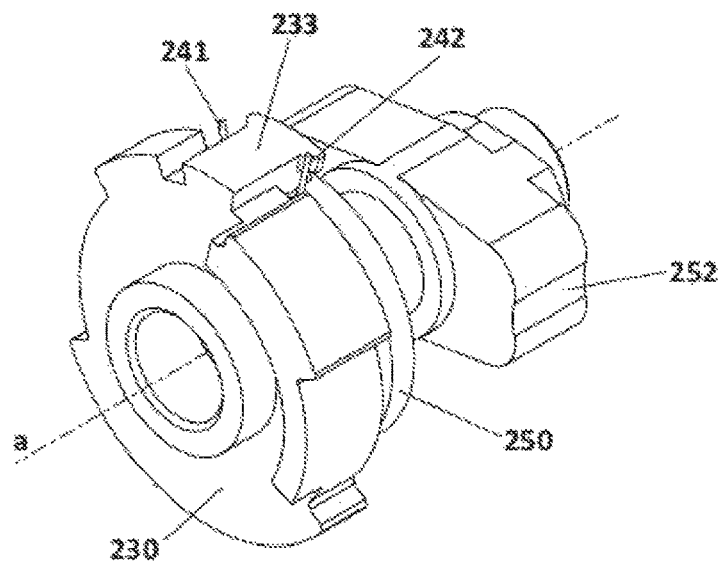
FIG. 10 shows a perspective view of a first exemplary embodiment of the connection between a second and a third body.

Furthermore, FIGS. 7A to 7C show three possible positions of the brake element 262 with respect to the second body 230 from the rear part of the first body 220 and corresponding to FIGS. 6A, 6C and 6D. FIGS. 8A and 8B show, in a perspective view from the front part of the first body 220, two positions A, B of the components of the mechanism according to the positions of the brake element 262 with respect to the first 220 and second 230 body corresponding to FIGS. 6E and 6G. FIGS. 9A and 9B show, in a perspective view from the third body 250, two positions A, B of the components of the mechanism corresponding to FIGS. 6E and 6G.

On the basis of said figures, it is observed how, depending on the situation of the protrusion 262 of the brake element 260 in the cam 221, the second body 230 rotates or does not rotate with respect to the first 220 since the protrusion 262 interacts or does not interact with the brake means 232 of the second body 230. Therefore, and as a function of the specific situation of the protrusion 262 via the path of the cam 221, the second body 230 adopts different positions with respect to the first body 220 when it rotates at the same time as the drive axle 211.

The second body 230 departs from a locking position with respect to the first body 220 when the drive axle 211 is at rest or when the drive axle starts to rotate and while the protrusion 262 is pushed against any of the two first sections 221a of the cam, depending on whether the drive axle 211 rotates in one direction or in another, said protrusion 262 which passes through the cam 221 is in contact with the brake means 232 of the second body 230, preventing the rotation of this second body 230. Said brake means 232 are preferably a protuberance or a notch on the surface of the second body 230 such that when the protrusion 262 is at a level which is determined by the first section 221a, it interacts with the brake means 232, thus preventing the movement of the second body 230 with respect to the first body 220.

Once the protrusion 262 starts to leave the first section 221a of the cam 221 as the rotation of the drive axle 211 continues, the protrusion 262 is faced with the change of path between the first section 221a and the second intermediate section 221b of the cam 221, therefore changing level and forcing or compression said protrusion 262 to the first spring 270. When the height or level of the protrusion 262 changes with respect to the brake means 232, there is still no contact between the two, therefore the second body 230 is free, thus a transition position present between the first section 221a and the intermediate section 221b or vice versa being established.

When the rotation of the drive axle 211 continues, the protrusion starts to slide over the second section 221b of the cam 221, following the path thereof. During this second section 221b, the protrusion 262 does not interact with the second body 230, but the pushing means 222 of the first body 220 contact, in the rotation thereof, the drive means 231 of the second body 230 such that the rotation of the first body 220 is transmitted to the second body 230. Thus a transmission position is defined in which the rotational movement is transmitted from the first body 220 to the second body 230 and where the brake element 260 is still not locking the second body 230.

In FIG. 3, a cam 221' is depicted, on the path of which the first section is only equivalent to the ends of said path and the second section to the path between both ends, while in FIGS. 4 and 5, it is observed how said first sections 221a are longer than those of FIG. 3. This determines the duration of the brake position of the second body 230 with respect to the first body 220.

The different positions of the protrusion 262 in the cam 221 are described in detail below with reference to FIG. 6, A to G, when the drive axle 211 and therefore the first body 220 rotate in one direction such that the protrusion 262 travels the entire length of the cam 221. In the figures, the rotational direction of the first body 220 is depicted with arrows.

Firstly, in the position 6A, the first body 220 is in an initial position and the protrusion 262 of the brake element 260 is in contact with the right vertical face of the cam 221. In the following position, the first body 220 rotates a few degrees to the position 6B, thus travelling the first section 221a of the cam 221 and the second body 230 being in the locking position. Prior to starting to compress the first spring 270 and from the previous position, the first body 220 rotates to a third position 6C in which said first spring 270 is compressed when the protrusion 262 lowers, being slid across the face of the cam 221 such that the protrusion 262 goes from the first section 221a to the second section 221b of the cam 221, in a transition position. From said third position, the first body 220 continues rotating to a fourth position, position 6D, while the protrusion 262 is slid via the second section 221b of the surface of the cam 221, in a transmission position of the rotational movement from the first body 220 to the second body 230. Then, from said fourth position 6D, the first body 220 rotates a few degrees more to a fifth position 6E in which the first spring 270 is decompressed and the protrusion 262 rises to the same radial height present at the start of the sequence, passing through the transition position again. Lastly, the first body 220 makes the final rotation thereof in the same direction, position 6F, where the protrusion 262 impacts the end of the cam 221, stopping the rotational movement of the first body 220.

Once the final position has been reached, the motor 210 stops, but the protrusion 262 is not maintained against the end of the cam 221, but rather due to the action of the second elastic element 240, 245, the second body 230 is pushed backwards, thus moving backwards and pushing the protrusion 262 backwards until entering into contact with the brake means 232 of said second body 230 and reaching the position 6G, locking the brake element 260 to the second body 230 or, i.e. the clutch actuating assembly 200 remaining braked.

The system is symmetric in both directions when the protrusion 262 of the brake element 260 is displaced along the cam 221 in one direction and in the opposite direction. In this way, when the motor 210 is re-activated, the motor axis 210 rotates in the direction opposite to the one previously described, causing the rotation of the first body 220 in the opposite direction to the one described and the previous movements and positions being reproduced.

All the steps of the movement of the first body 220 and the protrusion 262 of the brake element 260 have the object of activating and deactivating the brake element 260 which acts on the brake means 232 of the second body 230. The first body 220, in addition to deactivating the brake element 260, is responsible for driving the second body 230. As has been previously described, the first body 220 rotates freely to a position 6B, between the position 6B and 6C, compresses the first spring 270 and makes the protrusion 262 lower along the cam 221. From this position 6C and once the brake element 260 has been deactivated, the first body 220 starts to drive the second body 230 by way of the pushing means 222 which contact the drive means 231 in said second body 230. Once the first body 220 starts to drive the second body 230, the two move simultaneously until reaching the position 6F in which the first body 220 has rotated more than the second body 230 since it had started the rotation thereof beforehand and the second body 230 being driven by the first body 220.

In this way, the second body 230 is not capable of rotating unless the first body 220 has been previously rotated a few initial degrees to the position 6C, thus deactivating the brake element 260 when the protrusion 262 ceases to contact the brake means 232 of the second body 230. This brake element 260 act both on the journey there and back as a function of the rotational direction of the drive axle 211 and of the first body 220.

Similarly, in FIG. 7, in the sequences A to G matching the sequences A to G of FIG. 6, it is observed how the brake element 260 and consequently the protrusion 262 rises and lowers as a function of the rotation of the first body 220 with respect to the rotational axis "a".

In FIGS. 8 and 9, in the different sequences A to G matching the sequences A to G of FIG. 6, but from different perspectives, the different elements of the clutch actuating mechanisms 200 are observed in the different positions thereof during the rotation of the first body 220.

In particular, based on FIGS. 7 and 8, it can be verified that unless the brake element 260 and the protrusion thereof 262 lower, the second body 230 cannot rotate.

The brake element 260 enables, as detailed below, the mechanism to accumulate, in the second spring 240, 245, the energy exerted by the motor 210 in determined circumstances and until the motor 210 and the first body 220 return to the initial position.

Lastly, the rotational movement carried out by the motor 210 and by the first body 220 is transmitted, as has been described, by way of the different components of the clutch actuating mechanism 200 to the third body 250. This movement can be transmitted, as has been explained, from the second body 230 by way of the second spring 240, 245 to the third body 250 in different ways according to the relation between said second 230 and third 250 body and the type of second spring 240, 245 used.

Said third body 250 carries out a rotation of preferably 90° from the declutched position thereof, or position A, to the clutched position or position B. The rotation is transmitted to the third body 250 by the second body 230, and both positions are limited by stops 310 arranged on the casing or first rotor 300 against which protrusions 253 arranged on the third body 250 impact when the third body 250 rotates. Similarly, the rotation of the third body 250 between the cited two positions can be impeded by the clutch elements of the clutch mechanism situated between the first rotor 300 and the second rotor 450.

When the third body 250 goes from a declutched position to a clutched position, a protrusion 253 of the third body 250 impacts said travel stops 310 of the first clutched rotor 300, preventing the rotation of the third body 250 from continuing. The same occurs when the third body 250 returns to the declutched position, impacting the travel stops 310 of the first declutched rotor 300 from the clutched position.

Based on the foregoing, different situations can arise when the rotation ceases in a first direction of the drive axle 211 with respect to the first axis "a" and after the rotation of the first body 220 between the two end positions thereof having been produced and having transmitted said rotation to the third body 250 by way of the second body 230:

the mechanism can be maintained in the declutched position due to the actuation of the clutch elements arranged between the first rotor 300 and the second rotor 450 and which act on the third body 250, preventing the complete rotation of the same between the two positions thereof, which causes the overloading of the second elastic element 240, 245 due to the rotation of the second body 230 and the impossibility of the third body 250 to rotate.

the mechanism goes to the clutched position when the third body 250 rotates from the previous declutched position to the clutch position since the clutch elements arranged between the first rotor 300 and the second rotor 450 cease to act on the third body 250, causing the easing or unloading of the second elastic element 240, 245 which forces the rotation of said third body 250 in order to be aligned with the second body 230.

the mechanism goes directly from the declutched position to the clutched position when the third body 250 rotates, allowing the rotation of the second rotor 450 by way of the clutch elements arranged between the first rotor 300 and said second rotor 450 when these elements do not prevent the rotation of the third body 250.

Similarly, the rotation in the second direction of the drive axle 211, contrary to the previous rotation, with respect to the first axis "a" produces the opposing rotation of the first body 220 from the two end positions thereof.

Subsequently and once it has been detailed how the transmission of the rotational movement from the electric motor 210 to the third body 250 is carried out, it is necessary to clarify the different situations which arise between the third body 250 and the electronic cylinder formed by the two mechanisms, the clutch actuating mechanism 200 and the clutch mechanism as a function of the position of the knob. That is to say, the first rotor or casing 300 which comprises, in the interior thereof, the clutch actuating mechanism 200 object of the invention interacts by way of the third body 250 with the elements external to the clutch actuating mechanism 200. Specifically, the rotor 450 is observed which, by way of the rotation thereof, transmits the movement to the eccentric 610 of the cylinder 600 and a first exemplary embodiment of a transmission mechanism arranged between the first 300 and second 450 rotor with the different transmission elements.

Figure 18:
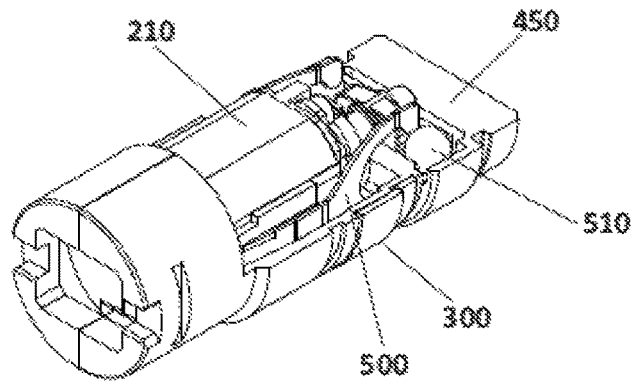
FIG. 18 shows a partially sectioned perspective view of the casing of the clutch actuating mechanism coupled to a second rotor.
Figure 19:
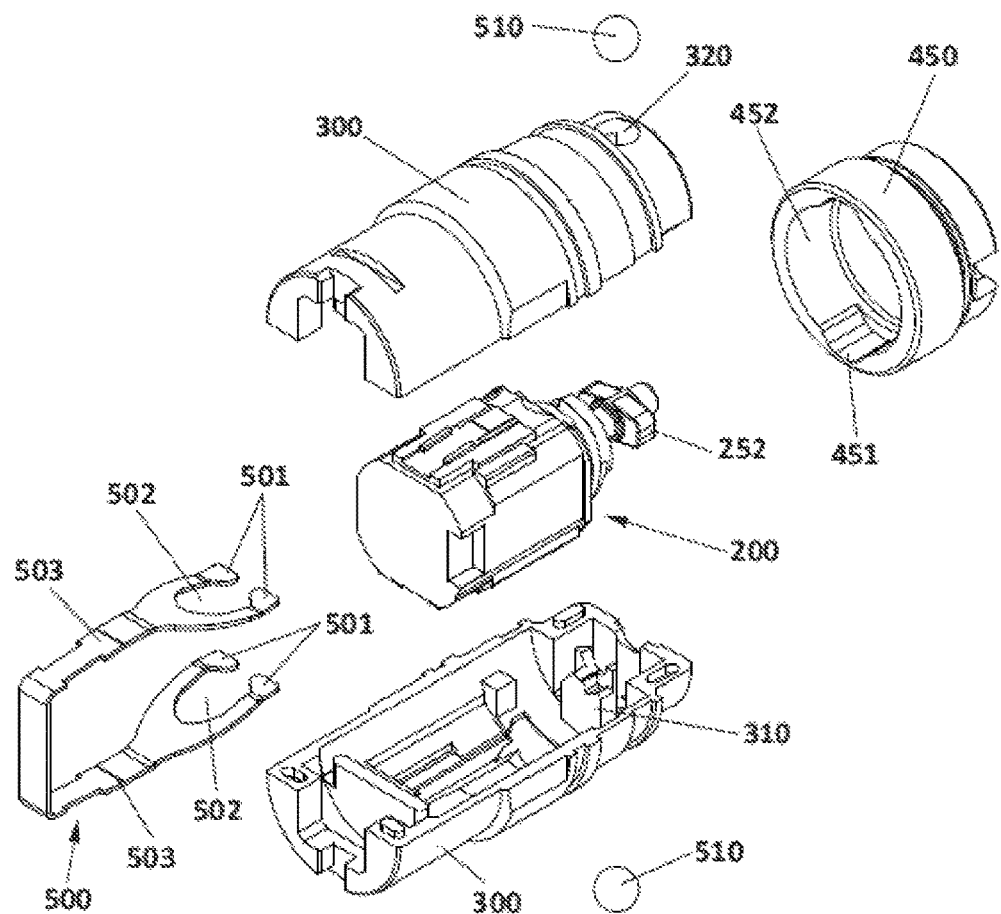
FIG. 19 shows an exploded view of the previous figure.

FIGS. 18 and 19 show an assembly in a perspective view of the first rotor or casing 300 with the clutch actuating mechanism 200 and the second rotor 450 as well as the clutch elements which form the clutch mechanism. Specifically, said clutch elements are preferably:

a radial pushing element, preferably a flat or stamped spring 500 which comprises two parallel arms 503 situated one at each side of the motor 210 and extending from one end of said motor 210 to the third body 250, where they end in a fork with two arms 501 separated by a space 502, the interior cylindrical surface 452 of the second rotor 450 which comprises at least two diametrically opposed grooves 451, and diametrically opposed rolling driving elements, preferably spheres 510, which have the capacity to be moved radially pushed by the flat spring 500, said spheres 510 being housed in diametrically opposed housings 320 situated in the first rotor 300 and situated between the arms 501 of the flat spring 500 and the interior surface 452 of the second rotor 450. These spheres 510 can roll over themselves with respect to any of the axes thereof and over the interior surface 452 of said second rotor 450, being housed in the grooves 451 of the same if the situation arises.

By means of the previous construction, when the rotation of the first rotor 300 also causes the rotation of the flat spring 500 which acts by pushing the spheres 510 against the interior surface 452 of the second rotor 450, these spheres rotate along said surface 452. Depending on the position of said clutch elements as well as on the position of the third body 250 of the clutch actuating mechanism 200, the movement is or is not transmitted from the first rotor 300 to the second rotor 450 and therefore to the eccentric 610 of the cylinder 600.

Figure 20:
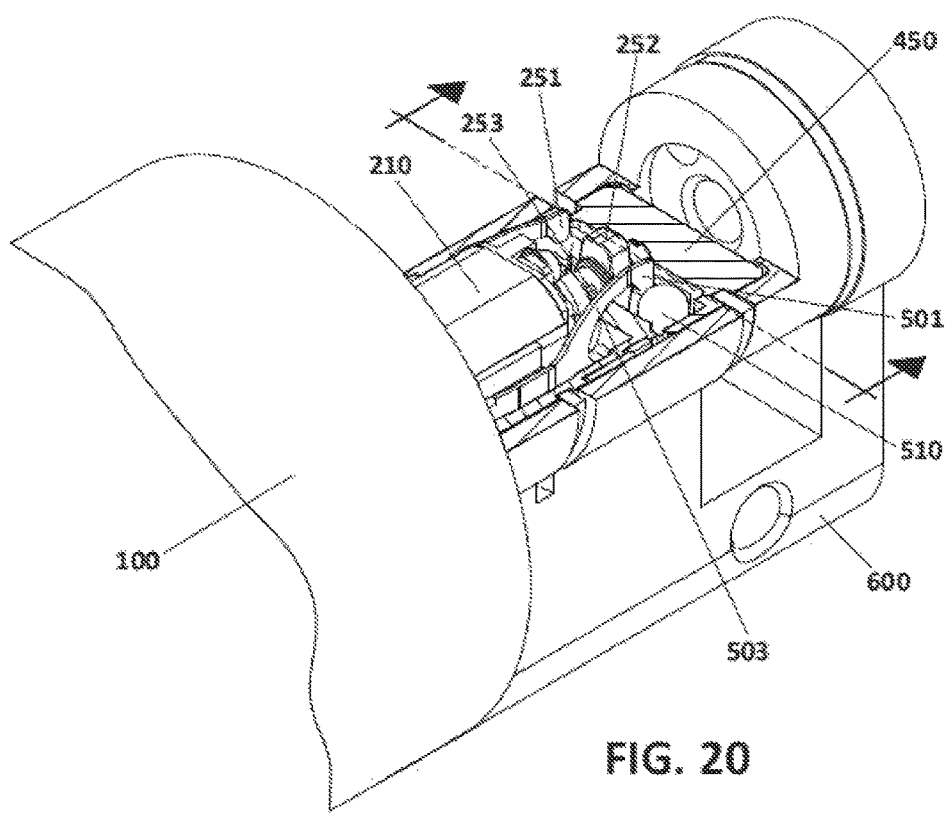
FIG. 20 shows a partially sectioned perspective view of the assembly formed by a knob, a clutch mechanism, a clutch actuating mechanism and a cylinder when the system is declutched.
Figure 21:
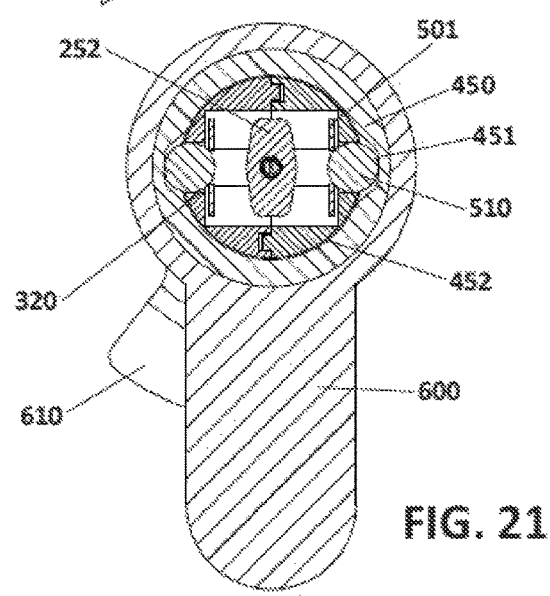
FIG. 21 shows the section indicated in FIG. 20 in which the clutch elements are observed in the declutched position.

FIGS. 20 and 21 show the declutched position of the assembly in which it is not possible to transmit the torque from the first rotor 300 to the second rotor 450 such that when the user transmits a torque via the knob 100, connected to the first rotor 300, the latter carries out a rotation around its own axis, matching the rotational axis "a" of the clutch actuating mechanism 200. In this position, the protrusions 252 of the third body 250 intended to interact with the clutch elements are located in a position perpendicular to the axis which passes through the centers of the spheres 510. This rotation of the first rotor 300 causes the rotation of the two spheres 510 which are introduced into housings 320 for such purpose in the first rotor 300. The rotation causes the spheres 510 to roll over said interior surface 452 and when the spheres 510 are opposed to the grooves 451, the spheres 510 are pushed by the flat spring 500 in the radial direction towards the exterior, that is to say, towards the interior of the grooves 451 rolling over the inclined surfaces of said grooves 452 and being situated in the interior of the same and therefore in the interior of the second rotor 450. As a torque continues to be transmitted to the first rotor 300, the spheres 510 leave the grooves 451 and are forced to be introduced into the housings 320 in the first rotor 300, overcoming the elastic force of the flat spring 500. This is the case because the torque required for the rotation of the second rotor 450 and in order to be able to act on the eccentric 610, is greater than the torque required to displace the spheres 510 to the interior of the first rotor 300, overcoming the force of the flat spring 500.

Figure 22:
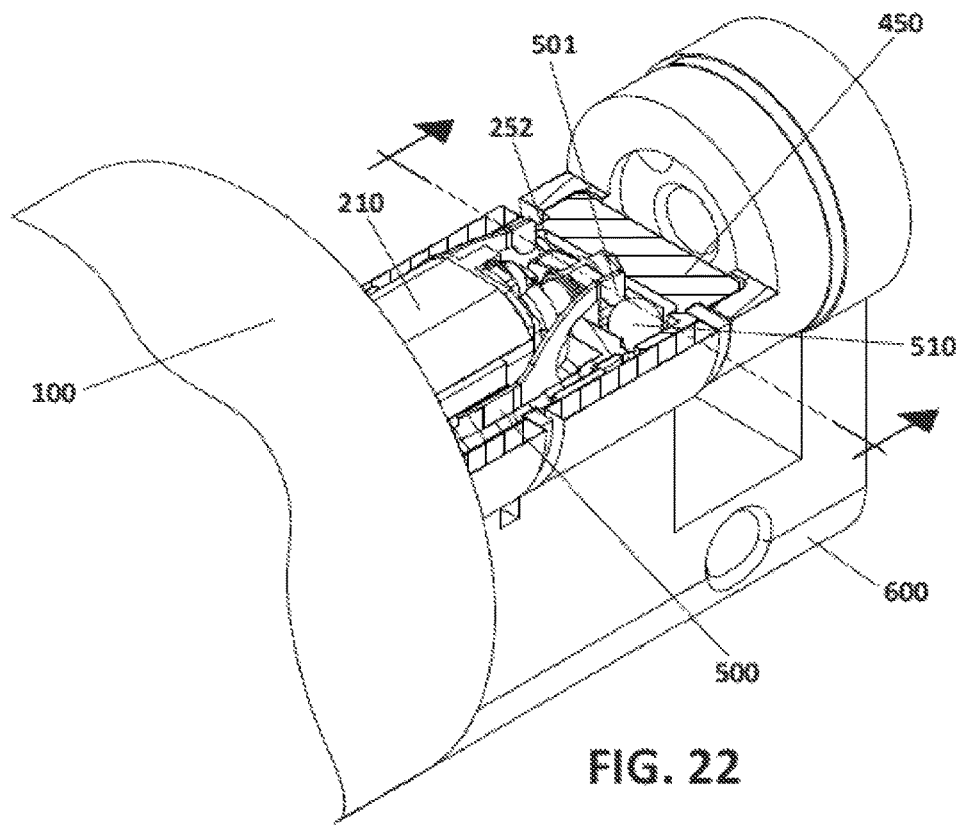
FIG. 22 shows a partially sectioned perspective view of the assembly formed by a knob, a clutch mechanism, a clutch actuating mechanism and a cylinder when the system is clutched.
Figure 23:
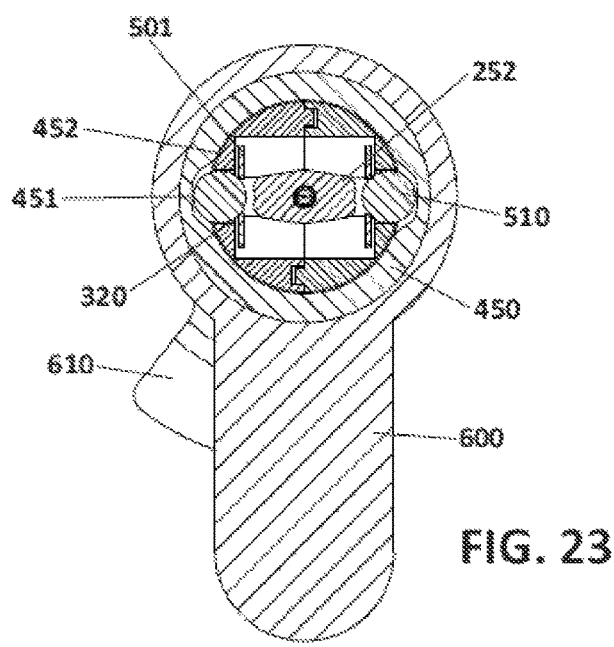
FIG. 23 shows the section indicated in FIG. 22 in which the clutch elements are observed in the clutched position.
Figure 24:
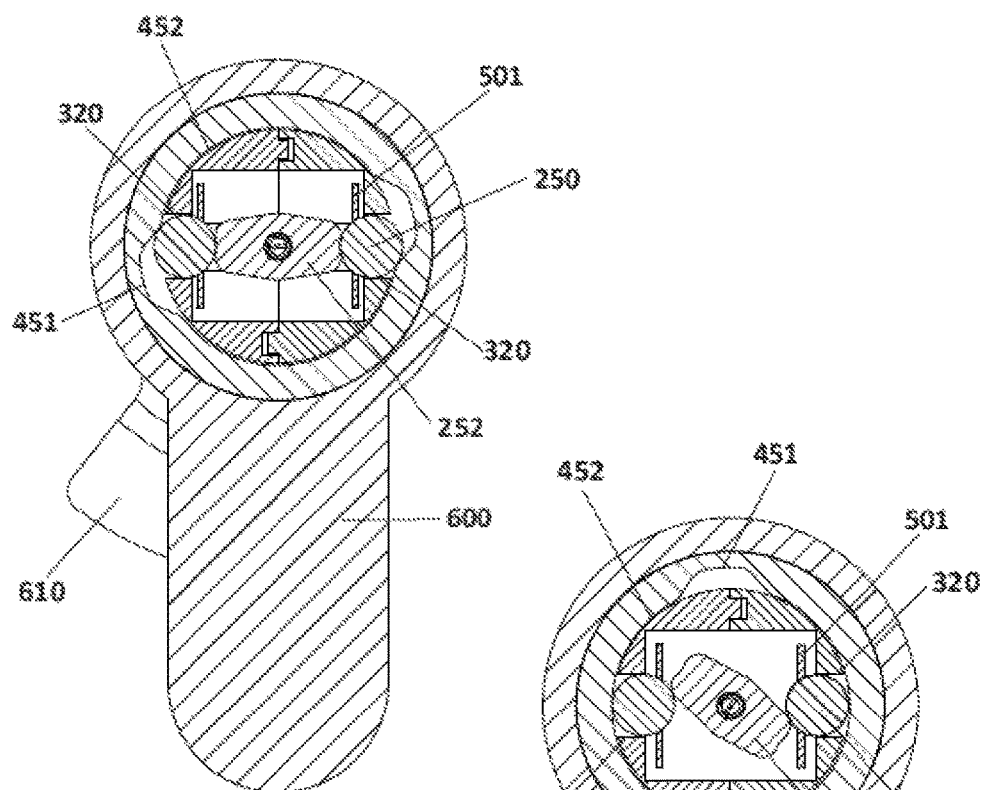
FIG. 24 shows a section of the cylinder in which the clutch elements are observed in a clutched position during the transmission between the first and the second rotor.

In addition, FIGS. 22 and 23 show the clutched position of the assembly in which the torque is transmitted from the first rotor 300 to the second rotor 450 and therefore to the eccentric 610 of the cylinder 600. In this position, the protrusions 252 of the third body 250 intended to interact with the clutch elements are located in a position aligned to the axis which passes through the centers of the spheres 510 which involves a rotation of approximately 90° with respect to the declutched position for which purpose the clutch actuating mechanism 200 had to be actuated with the aim of modifying the position of the third body 250 between a first and a second position. In order for the complete displacement of the third body 250 to the clutched position thereof to take place, the spheres 510 of the clutch mechanism must be in the grooves 451 of the second rotor 450, thus allowing the rotation of said third body 250, unlike the position shown in FIG. 25 where the spheres 510 are in the interior of the housings 320 in the first rotor 300, preventing the rotation of the third body 250. When a torque is transmitted via the first rotor 300, the spheres 510 situated in the interior of the grooves 451 roll over the faces of said grooves 451 to leave the same towards the interior of the housings 320 in the first rotor 300, but this movement is made impossible due to the protrusions 252 of the third body 250 which interfere with the spheres 510 and prevent them from leaving the grooves 451 irrespective of the rotation of the first rotor 300. This impossibility causes the spheres 510 to drive the second rotor 450 in the same rotational direction as that of the first rotor 300, overcoming the rotational torque of the eccentric 610 and making the same rotate as is observed in FIG. 24.

Figure 25:
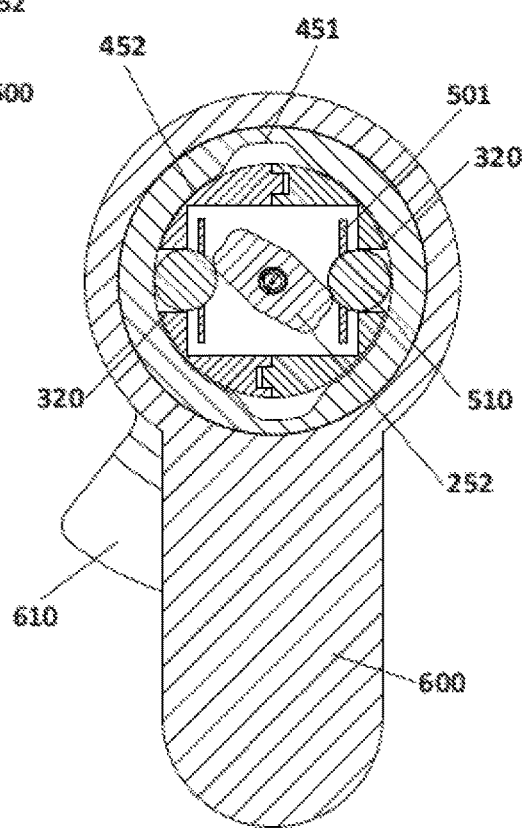
FIG. 25 shows a section of the cylinder in which the clutch elements are observed in a declutched transitory position.

Similarly, FIG. 25 shows a transition position between the declutched position to the clutched position shown in the previous FIGS. 20 to 24. Specifically, the third body 250 cannot rotate since the rolling driving spheres 510 are interposed between the protrusions 252 and the interior cylindrical surface 452 since they are not housed in the grooves 451 of the second rotor 450. This situation is resolved when the user makes the first rotor 300 rotate without transmitting the movement to the second rotor 450 until the moment at which the spheres 510 meet the grooves 451 and become housed in the same. At this moment, the third body 250 has the possibility of rotating freely to the clutched position owing to the energy accumulated in the second elastic element 240, 245. In this way, the clutch elements go to the position of FIG. 23 in which the rotation of the first rotor 300 transmits the rotation thereof to the second rotor 450.

The invention claimed is:

1. A clutch actuating mechanism of an electronic cylinder for locks for controlling the transmission of a rotational movement by way of clutch elements between a first rotor, in the interior of which the clutch mechanism is situated, and a second rotor which, with the rotation thereof, transmits a movement to an eccentric, in a cylinder body, comprising:
    an electric motor which actuates a drive axle which is coaxial to a first axis and which rotates in two directions;
    a first body installed in an inseparable manner on said drive axle and which comprises a cam and first pushing means;
    a second body coaxial to said first axis, arranged after said first body and which comprises first drive means and brake means;
    a third body coaxial to the first axis, arranged after said second body and on which the clutch elements act, wherein said third body rotates between a declutched position, in which the movement is not transmitted between the first and second rotor and a clutched position, in which the movement is transmitted between the first and second rotor;
    a moving brake element which has a protrusion at one end, said protrusion being associated with said cam of the first body;
    a first elastic element in contact with said brake element for controlling the position of the same in relation to the cam of the first body and in relation to the brake means of the second body; and
    a second elastic element between the second body and the third body and connected to both,
    by means of which a rotation in a first direction of the drive axle produces a rotation of the first body between an initial position and a final position and produces a transmission of a rotational movement from said first body to the second body and from the second body to the third body with a smaller rotational angle than that of the second body, causing an elastic load of the second elastic element.

2. The mechanism according to claim 1, wherein the brake element and the first elastic element are situated between the motor and the first body, the brake element pivoting around a second axis, parallel to the first rotational axis of the drive axle.

3. The mechanism according to claim 1, wherein the cam is a groove in the interior of which the protrusion of the brake element is situated, the protrusion of the brake element being driven towards a first surface of said groove by the first elastic element, the protrusion of the brake element being situated between the first elastic element and said first surface of the groove.

4. The mechanism according to claim 3, wherein said first surface of the groove follows a path which comprises two first sections, each one at one of two ends of the groove and at least one second intermediate section situated between said two first sections.

5. The mechanism according to claim 4, wherein in said first sections of the groove, the brake means of the second body are in contact with the protrusion of the brake element when the drive axle is at rest, thus limiting the movement of the second body with respect to the first body and defining a locking position of the brake element.

6. The mechanism according to claim 4, wherein the protrusion of the brake element is not in contact with the brake means of the second body when said protrusion is located in the intermediate section of the groove, allowing the movement of said second body together with the first body since the first pushing means of the first body are in contact with the first drive means of the second body, defining a transmission position where the brake element is not locking the second body.

7. The mechanism according to claim 4, wherein the protrusion of the brake element, when it is located between one of the first sections and the intermediate section of the groove, compresses the first elastic element and the first elastic element pushes the protrusion vertically and eliminates the contact between said protrusion and the brake means of the second body, defining a transition position of the brake element.

8. The mechanism according to claim 3, wherein said first surface is an upper surface of the groove against which the first elastic element pushes the protrusion.

9. The mechanism according to claim 1, wherein the second body and the third body are joined by the second elastic element arranged axially to the first axis, after the drive axle and independently of the latter such that said second elastic element transmits the rotation of the second body to the third body, causing a rotation in the third body from said declutched position to said clutched position or vice versa, accumulating energy in the elastic element.

10. The mechanism according to claim 9, wherein the second elastic element is a torsion spring which maintains the second and the third bodies joined by traction.

11. The mechanism according to claim 1, wherein the second body comprises second pushing means and the third body comprises second drive means, the relative position of which is controlled by the second elastic element arranged therebetween.

12. The mechanism according to claim 11, wherein the second pushing means of the second body and the second drive means of the third body contact the second elastic element situated between both, causing the rotation of the second body, the rotation of the third body from said declutched position to said clutched position or vice versa, accumulating energy in said elastic element when the second body rotates more than the third body.

13. The mechanism according to claim 1, wherein said clutch mechanism comprises at least the following clutch elements:
    two rolling spherical driving elements housed in housings arranged diametrically opposed in the first rotor,
    a radial pushing element in the form of a flat or stamped spring situated between the third body and the rolling driving elements, and
    an interior surface in the second rotor with at least two diametrically opposed grooves for housing the rolling spherical driving elements.

14. A method for operating a clutch actuating mechanism according to the clutch actuating mechanism of claim 1, wherein when the first body rotates between said initial position and said final position or vice versa, the protrusion of the brake element travels a path followed by the cam determining the following positions:

a locking position of the brake element when the protrusion is slid through the first section of a first end of the groove, a transition position of the brake element from locking to unlocking when the protrusion goes from being slid from the first section of the groove to the second section of the same, or vice versa, going from unlocking to locking, a transmission position where the brake element is not locking and the protrusion is slid through the second section of the groove, a transition position of the brake element from unlocking to locking when the protrusion goes from being slid from the second section of the groove to the first section of a second end of the same, or vice versa, going from locking to unlocking and a locking position of the brake element when the protrusion is slid through the first section of the second end of the groove.

15. The method according to claim 14, wherein after the rotation of the first body between the initial position and the final position or vice versa and with the clutch elements acting on the third body and preventing the rotation of said third body, the overloading of the second elastic element is caused due to the additional rotation of the second body with respect to the third body, said third body being maintained in the declutched position and making the rotation of the second rotor impossible.

16. The method according to claim 15, wherein the clutch elements cease to act on the third body, causing the easing or unloading of the second elastic element which forces the rotation of said third body when said second elastic element acts on the second drive means, the third body going to a clutched position and thus enabling the rotation of the second rotor.

17. The method according to claim 14, wherein after the rotation of the first body between the initial position and the final position or vice versa and with the clutch elements not acting on the third body, said third body rotates when the elastic element acts on the second drive means.

* * * * *